Patented May 15, 1951

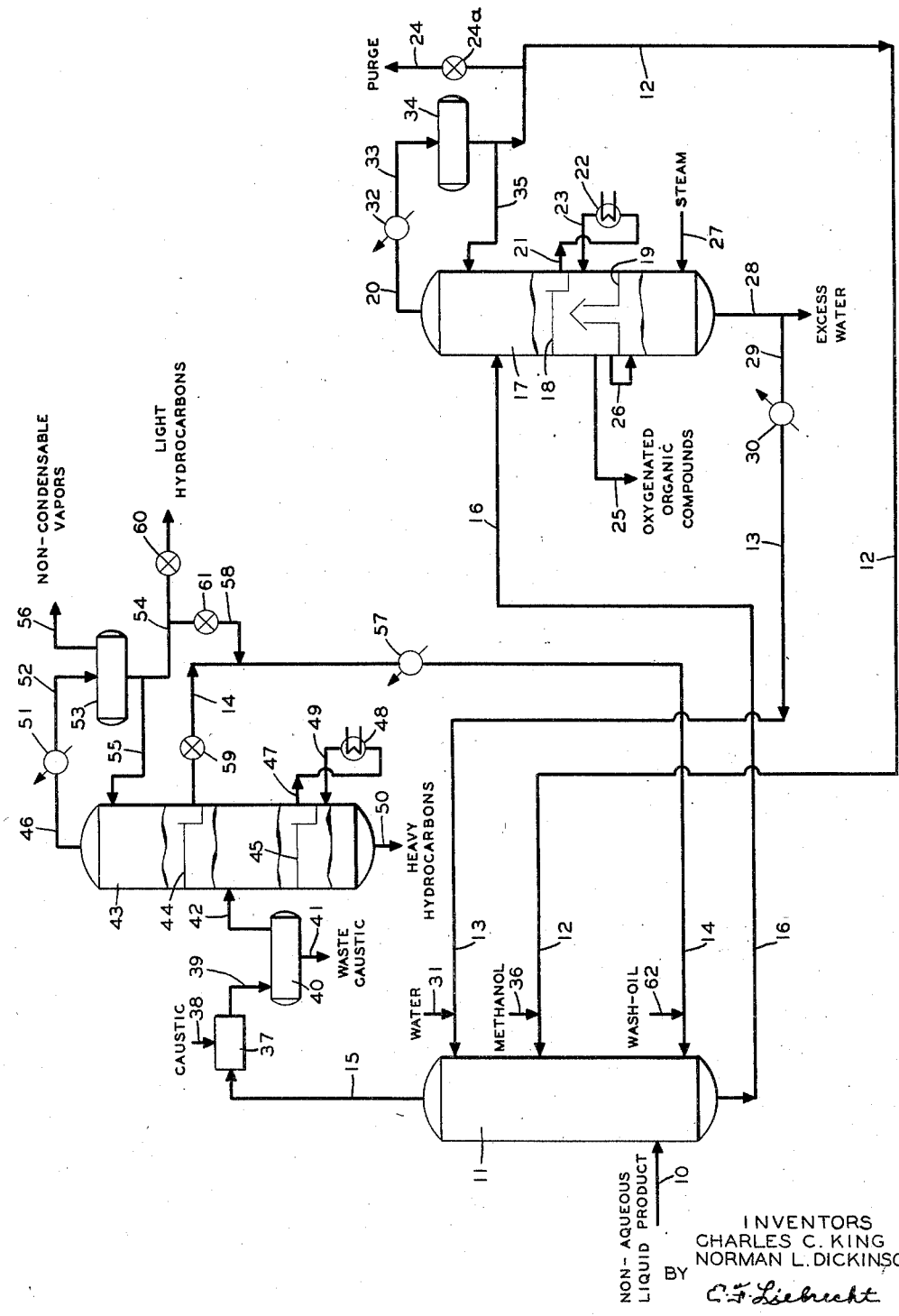

2,552,564

UNITED STATES PATENT OFFICE 2,552,564

SEPARATION OF ORGANIC COMPOUNDS

Charles C. King, Roselle, and Norman L. Dickinson, Basking Ridge, N. J., assignors to The M. W. Kellogg Company, Jersey City, N. J., a corporation of Delaware Application February 27, 1947, Serial No. 731,268

14 Claims. (Cl. 260—450)

1

This invention relates to the separation of organic compounds and relates more particularly to the separation of organic compounds from the reaction product obtained in the reduction of oxides of carbon with hydrogen in the presence of a catalyst at elevated temperatures. Still more particularly, the invention relates to the separation of oxygenated organic compounds and hydrocarbons from the non-aqueous liquid product obtained from the condensation of reactor gases in the catalytic hydrogenation of oxides of carbon at elevated temperatures.

In the hydrogenation of oxides of carbon in the presence of a reducible metal catalyst at elevated temperatures, a reaction product is obtained in the form of reactor outlet gases at temperatures falling between about 300° F. to about 700° F. and containing oxygenated organic compounds comprising essentially acids, alcohols, esters, aldehydes, ketones and hydrocarbons. These gases are passed through one or more condensation zones in which they are cooled to temperatures within the range from about 40° F. to about 150° F. to effect separation of the resulting condensate into a water phase and an oil phase. Both phases contain oxygenated organic compounds, those of lower molecular weight tending to remain in the water phase, while those of higher molecular weight tend to remain in the oil or non-aqueous liquid phase.

The recovery of the higher molecular weight oxygenated organic compounds from the oil or non-aqueous liquid phase, presents a high degree of difficulty by reason of their general insolubility in water when the usual methods for effecting such recovery are employed. For example, it has been the practice in laboratory and in industrial operations to water-wash this oil phase to remove whatever water-soluble low molecular weight compounds may be present, followed by treatment with caustic solutions to effect removal of organic acids. Such procedure leaves non-acid oxygenated chemicals in the oil phase which are not recovered. In addition, recovery of the organic acids in themselves is difficult and uneconomical inasmuch as their separation is subsequently effected by the usual method of neutralization with a strong inorganic acid, such as sulfuric acid or hydrochloric acid, resulting in large costs for both the caustic solution and inorganic acid.

It is an object, and the process of this invention is particularly directed, to provide for an improved method for the separation of substantially all oxygenated organic compounds and hydrocarbons present in the non-aqueous liquid phase derived from condensation of the reaction product obtained in the catalytic hydrogenation of oxides of carbon at elevated temperatures. Another object of the invention is to provide for an improved method for the efficient and economical separation of such compounds. Other objects and advantages will be apparent from the following more detailed disclosure.

The accompanying drawing illustrates diagrammatically, one form of the apparatus employed and capable of carrying out one embodiment of the process of our invention. While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated in the drawing. Pumps, compressors, some of the valves and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, the aforementioned non-aqueous liquid product, comprising essentially a mixture of organic acids, alcohols, esters, aldehydes, ketones and hydrocarbons, is supplied through line 10. This mixture is transferred through line 10 to a low point in an extraction tower 11. In tower 11 the mixture introduced through line 10 is subjected to intimate counter-current contact with a light alcohol as a treating agent, such as methanol or ethanol, which is introduced into tower 11 at an upper point through line 12. The treating agent and the non-aqueous liquid product introduced through line 10, are contacted in tower 11 under conditions effective to absorb in the treating agent all of the oxygenated compounds contained in the aforementioned non-aqueous liquid product and thus separate these oxygenated compounds from hydrocarbons present. As a result of such treatment, a lower aqueous alcohol layer and an upper hydrocarbon or oil layer are formed in tower 11. Inasmuch as anhydrous light alcohols exhibit high solubilities for hydrocarbons as well as for oxygenated compounds, dilution of such alcohols will effect an improvement in the selectivity of extraction, so that absorption of hydrocarbons in the alcohol treating agent is substantially prevented. To obtain such dilution, water is introduced into tower 11 at an upper point above the alcohol inlet through line 13. We have found that the use of water in the manner described is effective not only for the purpose of alcohol dilution, but also that its introduction at an upper point in tower 11 accomplishes the result of washing the upper hydrocarbon or oil layer, free of the added alcohol treating agent.

Aqueous methanol, used as a treating agent in the instant example, is not, however, completely selective in effecting total extraction of oxygenated organic compounds from hydrocarbons present in tower 11. Hence, the liquid flowing down tower 11 will contain some hydrocarbons in solution in addition to oxygenated organic compounds. These hydrocarbons may comprise a mixture of proportionately small quantities of all the hydrocarbons present in the non-aqueous liquid product entering tower 11 through line 10, and would render subsequent separation of pure oxygenated compounds highly difficult. A light hydrocarbon stream, functioning as a washoil, is therefore introduced at a point near the bottom of tower 11 through line 14. This hydrocarbon stream effects the washing of the lower aqueous methanol layer in tower 11, free of hydrocarbons contained therein in that these hydrocarbons are displaced by dilution, leaving the methanol layer saturated with the wash-oil. It is desirable that this wash-oil be of such composition that there are no components present in substantial amount, that are heavier than the highest boiling hydrocarbon which forms an azeotrope with the alcohol treating agent. The boiling range of the wash-oil selected must, therefore, be substantially within or below the boiling range of the oxygenated compounds that are to be separated.

Following the above mentioned wash-oil treatment, there are present in tower 11, an upper hydrocarbon or oil layer containing substantially all the hydrocarbons that were present in the non-aqueous liquid product entering tower 11 through line 10 and substantially large quantities of the wash-oil, and a lower aqueous methanol layer saturated with wash-oil and containing extracted oxygenated compounds. The upper hydrocarbon or oil layer is withdrawn overhead as a raffinate from tower 11 through line 15 for further treatment in the process hereinafter described. The lower aqueous methanol layer from tower 11 is withdrawn as an extract through line 16.

The lower aqueous methanol layer from tower 11, comprising a mixture of water and methanol containing oxygenated compounds and saturated with wash-oil, is transferred through line 16 to an upper point in a fractionation tower 17. Tower 17 is provided with a number of trays to effect separation between gases and liquids and is shown in the drawing with a portion broken away in order to describe the functions of tray 18 and an accumulator pan 19. The upper section of this tower is operated under conditions effective to separate the aqueous methanol layer introduced from tower 11, into an overhead alcohol fraction comprising essentially methanol and hydrocarbons, and a lower fraction consisting of two phases, one phase comprising substantially oxygenated compounds and the other phase comprising substantially water containing some dissolved oxygenated compounds. The overhead alcohol fraction in tower 17 is withdrawn as a vapor through line 20 for further use in the process hereinafter described. The lower aqueous fraction in tower 17 and condensed stripping vapor are transferred through line 21 into a reboiler 22 at a point below the introduction of the feed into tower 17 through line 16. Reboiler 22 is supplied to effect substantial vaporization of the aforementioned lower fraction, the degree of vaporization depending upon the combination of operating conditions of temperature and pressure and constituency of the fraction in tower 17 which is transferred into the reboiler. The fraction thus partially vaporized is returned to tower 17 from reboiler 22 through line 23. The liquid portion thus returned to tower 17 consists of two phases comprising an upper phase containing large quantities of oxygenated organic chemicals and a lower aqueous phase containing small quantities of dissolved oxygenated chemicals. The vaporized portion of the fraction returned to tower 17 through line 23, passes upward through trap-out tray 18 as stripping vapor to remove treating agent and wash-oil components from the downflowing liquid.

As described above, the liquid fraction return from reboiler 22 into tower 17 comprises an upper phase containing large quantities of oxygenated organic chemicals and a lower aqueous phase containing small quantities of dissolved oxygenated chemicals. These phases are deflected onto pan 19 where liquid settling between these phases takes place. The upper phase thus accumulated in pan 19, is withdrawn at a point above pan 19 through line 25 for further use or treatment outside the scope of the present process. The lower aqueous phase in pan 19, containing small quantities of dissolved oxygenated chemicals, is withdrawn outside through line 26 and returned to tower 17 at a point below pan 19. In order to strip out dissolved chemicals present in the aforementioned lower aqueous phase contained in pan 19, this aqueous phase is contacted with steam introduced into tower 17 through line 27. The rising vapor, thus obtained, effects the stripping of dissolved chemicals from the water. The hot vapors comprising a mixture of such chemicals with the stripping steam, pass upward through pan 19 where the chemicals are ultimately collected as components of the upper chemical phase contained in pan 19, from which they are withdrawn through line 25 as described above. Water remaining in tower 17, following the aforementioned stripping action, is withdrawn as bottoms through line 28.

A portion of the water obtained as bottoms from tower 17 through line 28, is transferred through line 29 at approximate boiling temperature to a cooler 30, where it is cooled to a temperature in the approximate range of 40° F. to 100° F. Water thus cooled is transferred from cooler 30 through line 13 into tower 11 for further use in the process hereinbefore described. Make-up water may be introduced into line 13 through line 31. Excess water obtained from tower 17, caused by the introduction of steam in the process described above, may be withdrawn through line 28.

The overhead fraction from tower 17, comprising essentially a mixture of methanol and hydrocarbons in the vapor state, is transferred through line 20 to a condenser 32. Condenser 32 is provided to liquefy the vaporized mixture transferred from tower 17 through line 20. The mixture of methanol and hydrocarbons thus condensed are transferred through line 33 into a reflux drum 34. From drum 34 the mixture is withdrawn through line 12 and transferred through line 35, with which line 12 connects, into tower 17 to provide reflux for this tower. A portion of the aforementioned mixture is also transferred from drum 34 through line 12 into tower 11, for repeated use as the methanol treating agent in the process hereinbefore described. Make-up methanol may be introduced into line 12 through line 36. It may be desirable to withdraw part of the overhead from tower 17 to avoid accumulating an undesirable high concentration of low boiling oxygenated compounds. Conveniently, this may be accomplished by withdrawing as required, a portion of the recovered solvent in line 12 by proper manipulation of valve 24a through a purge line 24 which connects with line 12.

As hereinbefore described, the upper hydrocarbon or oil layer in tower 11 is withdrawn overhead through line 15. Preferably, this oil is next treated with alkali to neutralize any traces of organic acids present that were not removed by the alcohol treating agent. For this purpose, the oil is transferred through line 15 to a caustic treater 37, in which it is intimately mixed with alkali, in a suitable amount, introduced through line 38. After the components of the mixture are maintained in intimate contact for a time sufficent to effect the desired reaction, the mixture is withdrawn from treater 37 through line 39 and transferred to a settler 40. In settler 40, the mixture thus introduced through line 39 will separate into an upper oil phase and a lower aqueous phase comprising unreacted alkali and salts of organic acids. The lower aqueous phase from settler 40 is withdrawn through line 41 for further use or treatment outside the scope of the present process.

The aforementioned upper oil phase in settler 40 is transferred through line 42 to a fractionation tower 43. Tower 43 is provided and suitably equipped to separate the oil into relatively low and high boiling hydrocarbon fractions. This tower is provided with a number of trays to effect separation between gases and liquids and is shown partly with portions broken away in the drawing in order to describe the functions of two such trays, namely, trays 44 and 45. This tower is operated under conditions effective to separate the oil introduced through line 42, into an upper fraction containing vaporized light hydrocarbons and a lower fraction comprising heavy hydrocarbons. The upper light hydrocarbon fraction is withdrawn overhead as a vapor from tower 43 through line 46 for further treatment in the process hereinafter described. The lower heavy hydrocarbon fraction and condensed stripping vapor are transferred at a point below the oil inlet from line 42, through line 47 into a reboiler 48. Reboiler 48 is supplied to provide sufficient heat to effect substantial vaporization of the aforementioned heavy hydrocarbon fraction from tower 43, the degree of vaporization depending upon the combination of operating conditions of temperature and pressure and constituency of the heavy hydrocarbon fraction which is transferred to reboiler 48. The fraction thus partially vaporized, is returned to tower 43 from reboiler 48 through line 49. This fraction, thus returned to tower 43, will comprise vaporized and liquid heavy hydrocarbons. Liquid heavy hydrocarbons are withdrawn as bottoms from tower 43 through line 50 for further use or treatment outside the scope of the present process. Vaporized heavy hydrocarbons pass upward through trapout tray 45 to strip the downflowing liquid of light hydrocarbons in the process described above.

As described above, the overhead fraction from tower 43 comprises light hydrocarbons in the vapor state. This fraction is transferred through line 46 to a condenser 51. Condenser 51 is provided to liquefy vaporized light hydrocarbons transferred from tower 43 through line 46. Hydrocarbons thus liquefied, are transferred through line 52 into a reflux drum 53. From drum 53, these hydrocarbons are withdrawn through line 54 and a portion is transferred through line 55, with which line 54 connects, into tower 43 to provide reflux for this tower. Non-condensable vapors in drum 53 are withdrawn through line 56. Light hydrocarbons thus obtained are also drawn off through line 56 for further use or treatment outside the scope of the present process. In order to provide a light hydrocarbon stream of such composition that it may be used as a wash-oil in tower 11 in the process hereinbefore described, an intermediate light hydrocarbon fraction contained in tray 44 is withdrawn as a side stream from tower 43 through line 14, cooled in cooler 57 and returned to tower 11 through line 14. We have found it advantageous to withdraw this fraction as a side stream in order to reduce its vapor pressure and thereby maintain the operating pressure of tower 11 at a minimum, when the aforementioned fraction is transferred to tower 11 through line 14 for use as a wash-oil in the process hereinbefore described. It is also possible to use a portion of the light hydrocarbons withdrawn from drum 53 through line 54 as a wash-oil in tower 11. Conveniently, this may be accomplished by transferring these light hydrocarbons from line 54 through line 58 into line 14 and by proper manipulation of valves 59, 60 and 61. Make-up quantities of wash-oil may be introduced into line 14 through line 62.

In the above described embodiment of the process of our invention, we have indicated the use of methanol as a treating agent, intended to absorb therein such oxygenated compounds that may be contained in the aforementioned non-aqueous liquid product entering tower 11. We have also indicated the necessity for proper aqueous dilution of the anhydrous alcohol, which exhibits high solubilities for hydrocarbons as well as for oxygenated compounds, so that improvement in selectivity of extraction is obtained, in that absorption of hydrocarbons in the alcohol is substantially prevented. We have found that the use of methanol and water in approximate proportions of 90% methanol and 10% water, is highly satisfactory when employed in the extraction of oxygenated compounds contained in the aforementioned non-aqueous liquid product, obtained from condensation of reactor gases in the catalytic hydrogenation of oxides of carbon. As alcohol concentrations are increased, the quantities of hydrocarbons present in the extract are proportionately increased, by reason of reduced selectivity of the alcohol. An increase in the quantities of wash-oil used to remove these hydrocarbons from the extract, is therefore necessitated. On the other hand, as alcohol concentrations are decreased, quantities of wash-oil required to remove hydrocarbons present in the extract, are also proportionately reduced by reason of increased selectivity in the alcohol. However, excessive dilution may result in incomplete extraction of oxygenated compounds and will, therefore, necessitate an increase in the quantities of aqueous alcohol in circulation. It will, therefore, be noted that the optimum benefits of the invention lie in the combined use of a wash-oil and an aqueous alcohol of such concentration which, from an economical standpoint, will render the most substantial selectivity of the alcohol in effecting total extraction of oxygenated compounds from hydrocarbons. It will, therefore, be apparent that the principal operating variables in extraction tower 11 are the rate of alcohol circulation, alcohol concentration and rate of wash-oil circulation. In effecting a given extraction, one or more of these variables may be changed if a compensatory change is made in one or more of the other variables. The most economical combination will be chosen for any given case. It should be noted, however, that the combination chosen may obviously be different as between different feed-stocks.

While we prefer to use methanol as an overall generally suitable treating agent in the process described, other light alcohols, such as ethanol or propanol, may also be successfully employed. Ethanol and propanol are less selective as solvents than methanol. However, their use in combination with increased quantities of water to improve their selectivity, may be desirable, in that the size of extraction tower 11 may be decreased, effecting proportionate savings in the cost of equipment. In addition, it should be noted that it is possible to use a mixture of light alcohols as a treating agent in the process described as well as individual light alcohol treating agents. In addition, other types of alcohols such as glycols may successfully be used as treating agents. Furthermore, other types of oxygenated organic compounds, or mixtures of such compounds, substantially more volatile than the bulk of oxygenated compounds being recovered, may be used as treating agents. For example, we may use such oxygenated organic compounds as ketones, e. g. acetone or methyl ethyl ketone, aldehydes; e. g. acetaldehyde and esters; e. g. ethyl acetate or methyl acetate. In addition, these compounds may be employed individually or in combination with the aforementioned alcohols as treating agents. In general, the selection of a suitable treating agent will depend upon the use of such oxygenated compounds as can easily be separated from extracted chemicals.

We have indicated that the selection of a suitable wash-oil, in the process described above, is determined by using an oil of such composition that there are no components present in substantial amounts, that are heavier than the highest boiling hydrocarbon which forms an azeotrope with treating agent. We have found n-pentane to be generally satisfactory as a wash-oil. However, it should be noted that other hydrocarbons having not more than eight carbon atoms per molecule such as butane, hexane, heptane or octane, individually or in mixtures thereof, may be successfully employed. It is also possible to employ other classes of hydrocarbons which form an azeotrope with the solvent treating agent, such as certain olefins. In this respect it should also be noted that the aforementioned intermediate light hydrocarbon stream, withdrawn from tower 43 through line 14 for use as a wash-oil, need not be a closely fractioned product but may contain any hydrocarbon or combination of hydrocarbons that meets the above-mentioned requirements.

It will be noted that the process of our invention has particular merit in the use of an alcohol as a treating agent in combination with a wash-oil, as one extraction step. The resulting saving in cost of equipment will be apparent from the fact that when the hydrocarbon fraction used as a wash-oil is mixed in one tower with the aforementioned non-aqueous liquid product used as a feed, an increase in the number of extraction towers is obviated.

Although our invention has been described with particular reference to a process for the separation of oxygenated organic compounds and hydrocarbons from the non-aqueous liquid product obtained from the condensation of reactor gases in the catalytic hydrogenation of oxides of carbon at elevated temperatures, it is not restricted thereto. The process of this invention may be applied in the separation of similar mixtures of organic compounds, without regard to the source or composition of such mixtures. While we have described a particular embodiment of our invention for purposes of illustration, it should be understood that various modifications and adaptations thereof, which will be obvious to one skilled in the art, may be made within the spirit of the invention as set forth in the appended claims.

Having thus described our invention, what we claim and desire to secure by Letters Patent is:

1. A method for separating water-insoluble oxygenated organic compounds from a mixture containing them and hydrocarbons which comprises: introducing such a feed-mixture into an extraction zone; introducing an aqueous solution of an oxygen-containing solvent for oxygenated compounds in said mixture into said extraction zone at a point above the introduction of said mixture; introducing a relatively low-boiling hydrocarbon as a wash-oil into said extraction zone at a point below the introduction of said feed-mixture to form a raffinate phase comprising hydrocarbons and an aqueous extract phase comprising oxygenated compounds; and withdrawing the phases thus produced from said extraction zone.

2. A method for separating water-insoluble oxygenated organic compounds from a mixture containing them and hydrocarbons which comprises: introducing such a feed-mixture into an extraction zone; introducing an aqueous solution of an oxygen-containing solvent for oxygenated compounds in said mixture into said extraction zone at a point above the introduction of said mixture; introducing water into said extraction zone at a point above the introduction of said solvent; introducing a relatively low-boiling hydrocarbon as a wash-oil into said extraction zone at a point below the introduction of said feed-mixture to form a raffinate phase comprising hydrocarbons and an aqueous extract phase comprising oxygenated compounds; and withdrawing the phases thus produced from said extraction zone.

3. In a process for the catalytic hydrogenation of an oxide of carbon in which the reaction product therefrom is treated to form an oil product liquid phase comprising a mixture of water-insoluble oxygenated organic compounds, the method for separating said oxygenated compounds from said mixture which comprises: introducing such a feed-mixture into a vertical extraction zone; introducing an aqueous solution of a solvent comprising a light alcohol into said extraction zone at a point above the introduction of said mixture; introducing water into said extraction zone at a point above the introduction of said solvent; introducing pentane as a wash-oil into said extraction zone at a point below the introduction of said feed-mixture to form a raffinate phase comprising hydrocarbons and an aqueous extract phase comprising oxygenated compounds; and withdrawing the phases thus produced from said extraction zone.

4. A method for separating water-insoluble oxygenated organic compounds from a mixture containing them and hydrocarbons which comprises: introducing such a feed-mixture into an extraction zone; introducing an aqueous solution of an oxygen-containing solvent for oxygenated compounds in said mixture into said extraction zone at a point above the introduction of said mixture; introducing a relatively low-boiling hydrocarbon as a wash-oil into said extraction zone at a point below the introduction of said feed-mixture to form a raffinate phase comprising hydrocarbons and an aqueous extract phase comprising oxygenated compounds; withdrawing the phases thus produced from said extraction zone; distilling said raffinate phase to produce a relatively low-boiling fraction and a relatively high-boiling fraction; and utilizing said relatively low-boiling fraction as a wash-oil for treating further quantities of said feed-mixture.

5. A method for separating water-insoluble oxygenated organic compounds from a mixture containing them and hydrocarbons which comprises: introducing such a feed-mixture into an extraction zone; introducing an aqueous solution of an oxygen-containing solvent for oxygenated compounds in said mixture into said extraction zone at a point above the introduction of said mixture; introducing water into said extraction zone at a point above the introduction of said solvent; introducing a relatively low-boiling hydrocarbon as a wash-oil into said extraction zone at a point below the introduction of said feed-mixture to form a raffinate phase comprising hydrocarbons and an aqueous extract phase comprising oxygenated compounds; withdrawing the phases thus produced from said extraction zone; distilling said raffinate phase to produce a relatively low-boiling fraction and a relatively high-boiling fraction; and utilizing said relatively low-boiling fraction as a wash-oil for treating further quantities of said feed-mixture.

6. In a process for the catalytic hydrogenation of an oxide of carbon in which the reaction product therefrom is treated to form an oil product liquid phase comprising a mixture of water-insoluble oxygenated organic compounds, the method for separating said oxygenated compounds from said mixture which comprises: introducing such a feed-mixture into a vertical extraction zone; introducing an aqueous solution of a solvent comprising a light alcohol into said extraction zone at a point above the introduction of said mixture; introducing water into said extraction zone at a point above the introduction of said solvent; introducing pentane as a wash-oil into said extraction zone at a point below the introduction of said feed mixture, to form a raffinate phase comprising hydrocarbons and an aqueous extract phase comprising oxygenated compounds; withdrawing the phases thus produced from said extraction zone; distilling said raffinate phase to produce a relatively low-boiling fraction and a relatively high-boiling fraction; and utilizing said relatively low-boiling fraction as a wash-oil for treating further quantities of said feed-mixture.

7. The method of claim 2 in which the solvent is a ketone.

8. The method of claim 2 in which the solvent is an aldehyde.

9. The method of claim 2 in which the solvent is an ester.

10. The method of claim 3 in which the solvent is methanol.

11. The method of claim 2 in which said wash-oil is a hydrocarbon whose boiling range is substantially within the boiling range of said oxygenated compounds.

12. The method of claim 2 in which said wash-oil is a hydrocarbon which forms an azeotrope with the solvent treating agent.

13. The method of claim 2 in which said wash-oil is a hydrocarbon whose boiling range is substantially below the boiling range of said oxygenated compounds.

14. The method of claim 2 in which said wash-oil is a hydrocarbon having not more than eight carbon atoms per molecule.

CHARLES C. KING.
NORMAN L. DICKINSON.

REFERENCES CITED

The following references are of record in the file of this patent:

UNITED STATES PATENTS

| Number | Name | Date |
| --- | --- | --- |
| 1,835,600 | James | Dec. 8, 1931 |
| 1,838,032 | Wiezevich | Dec. 22, 1931 |
| 2,002,533 | Frolich et al. | May 28, 1935 |
| 2,073,054 | Franzen | Mar. 9, 1937 |
| 2,222,215 | Ewing | Nov. 19, 1940 |
| 2,228,929 | Reibnitz | Jan. 14, 1941 |
| 2,342,028 | Zellner | Feb. 15, 1944 |
| 2,422,794 | McCorquodale et al. | June 24, 1947 |